(12) United States Patent
Chai et al.

(10) Patent No.: US 12,469,217 B2
(45) Date of Patent: Nov. 11, 2025

(54) INFINITE-SCALE CITY SYNTHESIS

(71) Applicants: Menglei Chai, Los Angeles, CA (US); Hsin-Ying Lee, San Jose, CA (US); Chieh Lin, Merced, CA (US); Willi Menapace, Santa Monica, CA (US); Aliaksandr Siarohin, Los Angeles, CA (US); Sergey Tulyakov, Santa Monica, CA (US)

(72) Inventors: Menglei Chai, Los Angeles, CA (US); Hsin-Ying Lee, San Jose, CA (US); Chieh Lin, Merced, CA (US); Willi Menapace, Santa Monica, CA (US); Aliaksandr Siarohin, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 271 days.

(21) Appl. No.: 18/090,657

(22) Filed: Dec. 29, 2022

(65) Prior Publication Data
US 2024/0221309 A1 Jul. 4, 2024

(51) Int. Cl.
*G06T 17/05* (2011.01)
*G06T 7/174* (2017.01)
*G06T 17/00* (2006.01)

(52) U.S. Cl.
CPC ............... *G06T 17/05* (2013.01); *G06T 7/174* (2017.01); *G06T 17/005* (2013.01); *G06T 2207/20081* (2013.01); *G06T 2207/20084* (2013.01)

(58) Field of Classification Search
CPC . G06T 2207/30196; G06T 2207/30232; G06T 2207/30242; G06T 7/0002;
(Continued)

(56) References Cited

U.S. PATENT DOCUMENTS

| 6,732,146 B1 | 5/2004 | Miyake |
| 12,059,615 B2 * | 8/2024 | Shen ..................... A63F 13/655 |

(Continued)

FOREIGN PATENT DOCUMENTS

WO 2020139054 A1 7/2020

OTHER PUBLICATIONS

International Search Report and Written Opinion for International Application No. PCT/US2023/086016, dated Apr. 22, 2024 (Apr. 22, 2024)—10 pages.

*Primary Examiner* — Ming Wu
(74) *Attorney, Agent, or Firm* — CM Law; Stephen Weed

(57) ABSTRACT

An environment synthesis framework generates virtual environments from a synthesized two-dimensional (2D) satellite map of a geographic area, a three-dimensional (3D) voxel environment, and a voxel-based neural rendering framework. In an example implementation, the synthesized 2D satellite map is generated by a map synthesis generative adversarial network (GAN) which is trained using sample city datasets. The multi-stage framework lifts the 2D map into a set of 3D octrees, generates an octree-based 3D voxel environment, and then converts it into a texturized 3D virtual environment using a neural rendering GAN and a set of pseudo ground truth images. The resulting 3D virtual environment is texturized, lifelike, editable, traversable in virtual reality (VR) and augmented reality (AR) experiences, and very large in scale.

18 Claims, 8 Drawing Sheets

(58) Field of Classification Search
CPC .. G06T 7/13; G06T 7/20; G06T 7/521; G06T 7/55; G06T 7/70; G06T 7/75; G06F 16/23; G06F 16/235; G06F 16/288; G06F 16/55; G06F 16/583; G06F 16/5846; G06F 16/90335; G06F 17/18; G06F 18/2115

See application file for complete search history.

(56) References Cited

U.S. PATENT DOCUMENTS

| | | | |
|---|---|---|---|
| 2019/0035149 | A1 | 1/2019 | Chen et al. |
| 2019/0236531 | A1* | 8/2019 | Adato .................. G06Q 10/087 |
| 2019/0325379 | A1* | 10/2019 | Medina .................. A47L 11/28 |
| 2020/0151559 | A1 | 5/2020 | Karras et al. |
| 2021/0304452 | A1 | 9/2021 | Lee |
| 2021/0335050 | A1 | 10/2021 | Zavesky et al. |
| 2022/0044352 | A1 | 2/2022 | Liao et al. |
| 2022/0269999 | A1* | 8/2022 | Arumugam ............ G06Q 10/02 |

* cited by examiner

INFINITE-SCALE CITY SYNTHESIS

TECHNICAL FIELD

Examples set forth in the present disclosure relate to virtual reality (VR) experiences, machine learning, and generative adversarial networks. More particularly, but not by way of limitation, the present disclosure describes synthesis frameworks for generating relatively large and 3D-grounded virtual environments, such as cityscapes.

BACKGROUND

Virtual reality (VR) technology generates a complete virtual environment including realistic images, sometimes presented on a VR headset or other head-mounted display. VR experiences allow a user to move through the virtual environment and interact with virtual objects. AR is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

Machine learning refers to mathematical models or algorithms that improve incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

A generative adversarial network (GAN) is a class of machine-learning frameworks in which two artificial neural networks (e.g., a generator and a discriminator) are trained together. Using a training dataset, the generator module is trained by generating new data (e.g., new synthetic images) which have the same or similar characteristics (e.g., statistically, mathematically, visually) as the reference data in the training dataset (e.g., thousands of sample images). The generator module generates candidates (e.g., new images) based on the reference data. The discriminator module evaluates the candidates by determining the degree to which each candidate is similar to the reference data (e.g., by assigning a value between zero and one). A candidate produced by the generator is classified as better (e.g., a value closer to one) if the discriminator concludes that the candidate is highly similar to the reference data. A candidate is classified as poor (e.g., a value closer to zero) if the discriminator concludes that it is less similar to the reference data (e.g., the candidate appears to be synthesized or fake). Typically, the generator and the discriminator are trained together. The generator learns and produces better and better candidates, while the discriminator learns and becomes more skilled at identifying poor candidates.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element. When referring to a non-specific one or more elements the lower-case letter may be dropped.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

Virtual environments are generated from a synthesized two-dimensional (2D) satellite map of a geographic area, a three-dimensional (3D) voxel environment, and a voxel-based neural rendering framework. In an example, the synthesized 2D satellite map is generated by a map synthesis generative adversarial network (GAN) trained using sample city datasets. The 3D voxel environment is converted to a texturized 3D virtual environment using a neural rendering GAN and a set of pseudo ground truth images. The realistic, texturized 3D virtual environment is editable, traversable in virtual reality (VR), and scalable.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1:
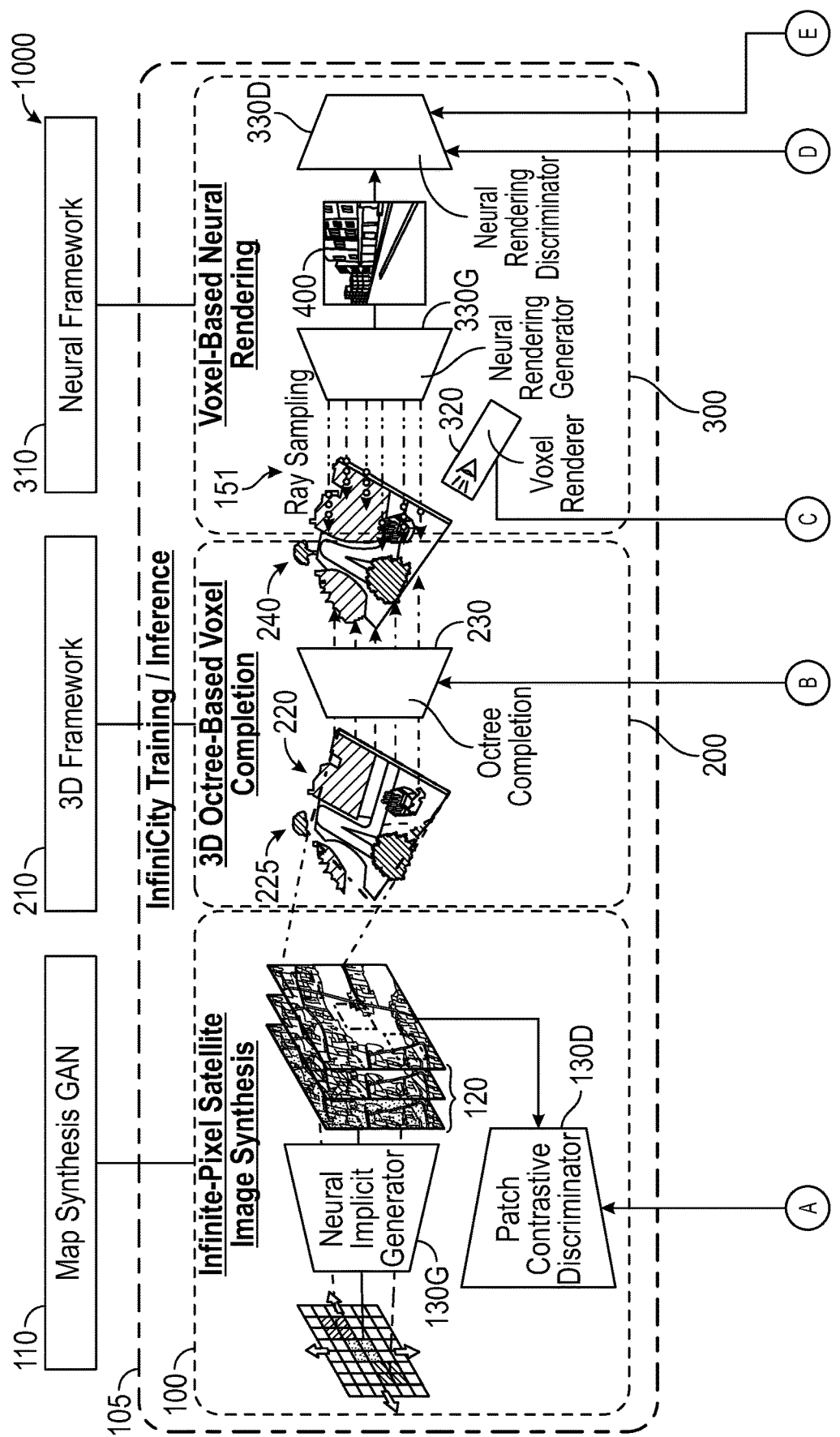
FIG. 1 is a block diagram of an example environment synthesis framework.
Figure 1:
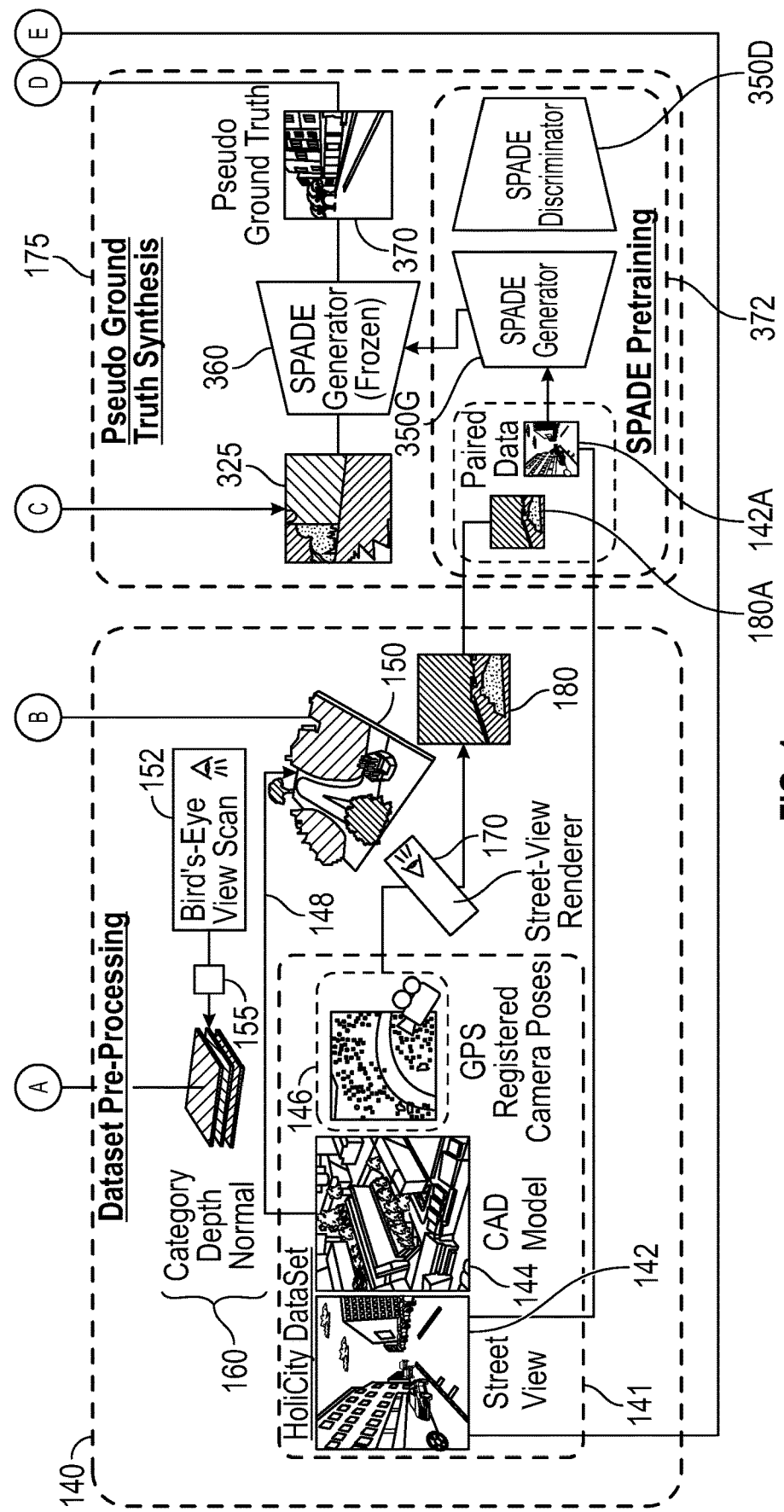

FIG. 1 is a block diagram of an example environment synthesis framework 1000 for generating a texturized three-dimensional (3D) virtual environment 400. In some implementations, the framework 100 includes an infinite-pixel image synthesis module 100 for generating a synthesized two-dimensional (2D) satellite map 120 of a geographic area, an octree-based voxel completion module 200 for converting the map 120 into a watertight 3D voxel environment 240, and a voxel-based neural rendering framework 300 for generating the virtual environment 400 that is based on the 3D voxel environment 240. In a related aspect, the neural rendering framework 300 in some implementations texturizes the 3D voxel environment 240, as described herein. The synthesized 2D satellite map 120 in some implementations is associated with a virtual geographic area, arbitrarily large, and generated from random noises.

As used herein, the term "infinite" includes and refers to a relatively large field, the area of which is not limited by the size of the training dataset, but instead is limited primarily by computational resources (e.g., memory, processor speed, model training duration). In contrast, many existing synthesis models generate images and environments in groups of relatively small fields or segments, which are limited to a finite area by the size of the training dataset itself. With sufficient computing resources, the synthesis framework 1000 described herein is capable of generating very large maps without being limited by the size of the training dataset. In this aspect, the potential size of the maps and images generated is not finite.

Whereas a pixel represents an elemental portion of a two-dimensional image, a voxel represents a three-dimensional (3D) region (e.g., a cube) in space. Voxels are often used in volumetric or 3D rendering.

An octree is a data structure in which each internal node has eight child nodes. Octrees are often used to partition a three-dimensional space by recursively subdividing the space into eight octants. Octrees are particularly useful with 3D voxels, which are typically shaped like a cube having eight vertices. In general, using octree representation facilitates greater memory and computing efficiency.

Although discussed in the context of an urban area or cityscape, the systems and methods described herein are applicable for generating essentially any kind of virtual environment. City scenes as well as other types of environments are ubiquitous in contemporary gaming, virtual reality (VR), and augmented reality (AR) experiences. Synthesizing a complete 3D environment all at once is currently impractical with existing techniques and hardware constraints.

The environment synthesis framework 1000 in some implementations operates in three general stages, as shown from left to right in FIG. 1: an infinite-pixel image synthesis module 100, an octree-based voxel completion module 200, and a voxel-based neural rendering framework 300. The first sheet of FIG. 1 shows the training module 105 referred to as the InfinitCity Training/Inference module.

Figure 2:
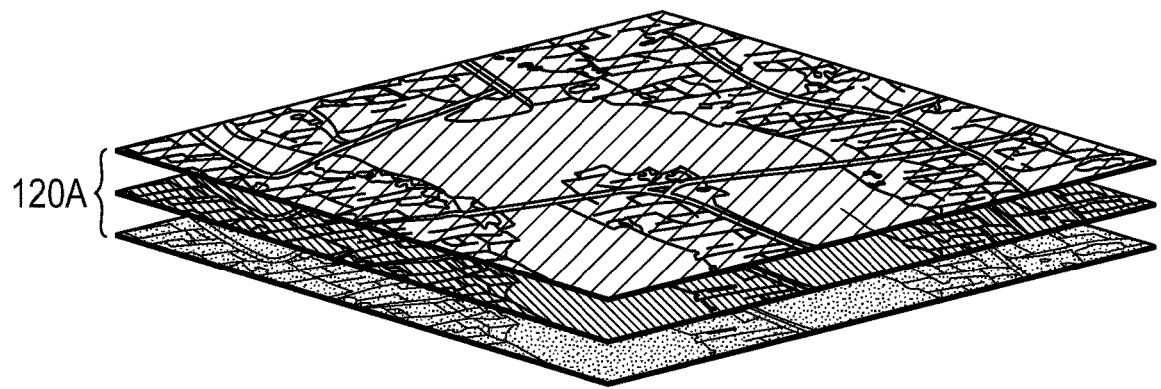
FIG. 2 is a perspective illustration of an example set of synthesized 2D map images.

The image synthesis module 100 in some implementations includes a map synthesis generative adversarial network (GAN) 110 that generates the synthesized 2D satellite map 120 in accordance with the a of synthesized 2D map images 160 (shown on the second sheet of FIG. 2). The map synthesis GAN 110 in some implementations is a tool called InfinityGAN, which synthesizes arbitrarily large maps with a neural implicit representation. The infinite-pixel image synthesis module 100 in some implementations includes a neural implicit generator 130G in operative communication with a patch contrastive discriminator 130D. The synthesized 2D satellite map 120 is generated in multiple data modalities (e.g., category, depth, and normal). The synthesized 2D satellite map 120 in some implementations is associated with a geographic area (e.g., a region in a virtual world) or a virtual environment (e.g., a gaming world, a VR or AR environment).

The octree-based voxel completion module 200 in some implementations includes an octree-based 3D voxel representation 220 that is based on the synthesized 2D satellite maps ($\hat{I}^{CDN}$) 120, and an octree completion module 230 that converts the octree-based voxel representation 220 into a watertight 3D voxel environment 240 in accordance with a set of octrees 150 (shown on the second sheet of FIG. 2). The voxel completion module 200 in some implementations utilizes a 3D completion framework 210 which, in some examples, is accomplished by using a model known as O-CNN.

The voxel-based neural rendering framework 300 uses neural rendering to generate the virtual environment images 400 based on the watertight 3D voxel environment 240. The neural rendering framework 300 in some implementations renders the texturized virtual environment images 400 using a neural framework 310 (e.g., using a tool known as GAN-craft, which is particularly useful in synthesizing large-scale outdoor scenes). As shown, the framework 300 in some implementations 240 includes a voxel renderer 320, a ray sampling tool 151, and a neural rendering generator 330G in operative communication with a neural rendering discriminator 330D.

The second sheet of FIG. 1 is a schematic diagram of several other components of the environment synthesis framework 1000, including dataset pre-processing module 140 and pseudo ground truth synthesis module 175.

The city dataset 141 in some implementations includes a plurality of street view images 142, a Computer-Aided Design (CAD) model (C) 144, and a plurality of GPS-registered camera images 146 (e.g., a plurality of images (I) each associated with and an orientation or pose (p)).

The dataset pre-processing module 140 in some implementations includes a street view renderer 170 which uses the GPS-registered camera locations along with the annotated camera poses $\{p_j\}$ to render a set of segmentation images $\{I_j^{seg}\}$ 180 which correspond to the street view images $(I_j)$ 142 from the city dataset 141. The paired data $\{I_j^{seg}, I_j\}$ that includes the set of segmentation images $\{I_j^{seg}\}$ 180 and the corresponding set of street view images $(I_j)$ 142 in some implementations serves as the training data for the image ground truth pre-training GAN 372 (e.g., a tool known as SPADE, which performs semantic image analysis with spatially adaptive normalization).

The dataset pre-processing module 140 in some implementations includes a conversion tool 148 (e.g., a product called Mesh2Octree) which converts and partitions the data in the CAD model 144 into a set of octrees $\{Oi\}$ 150. Each set of octrees $\{Oi\}$ 150 in some implementations represents a sub-region of the city. As shown, the set of octrees $\{Oi\}$ 150 in some implementations is transmitted to the octree completion module 230 (on the first sheet of FIG. 1).

The CAD model 144 in some implementations is part of a city dataset 141 (e.g., the HoliCity dataset, which is a large-scale dataset based on a 3D CAD model of London). The CAD model 144 in some implementations includes object-level category annotations collected by multiple sources, including Google street view images. The HoliCity dataset contains more than 50,000 images, each registered to the CAD model and including GPS location and camera orientation.

The dataset pre-processing module 140 in some implementations includes one or more tools for conducting a bird's-eye view scan 152 of the set of octrees $\{Oi\}$ 150. The scan in some implementations extracts multiple modalities of the octree surface information into a set of surface octrees $\{O_i^{SUR}\}$ 155 from the top-down direction. This set of surface octrees $\{O_i^{SUR}\}$ 155 in some implementations are further converted into a set of synthesized 2D map images 160 (e.g., categorical, depth, and normal modalities) which are jointly denoted as $I^{CDN}$. The paired data $\{O_i, O_i^{SUR}\}$ that includes the set of octrees $\{Oi\}$ 150 and the set of surface octrees $\{O_i^{SUR}\}$ 155, in some implementations, constitutes the training data for the octree-based voxel completion module 200. As shown, the set of synthesized 2D map images 160 is transmitted to the patch contrastive discriminator 130D (shown on the first sheet of FIG. 1). The set of synthesized 2D map images $\{I^{CDN}\}$ 160 in some implementations serves as the training data for the infinite-pixel image synthesis module 100.

The pseudo ground truth synthesis module 175 is configured to generate a set of pseudo ground truth images 370 in accordance with an image ground truth pre-training GAN 372 (e.g., the SPADE pre-training GAN). The SPADE pre-training GAN 372 is training by using a paired data $\{I_j^{seg}, I_j\}$ which includes a set of segmentation images $\{I_j^{seg}\}$ 180A and the corresponding set of street view images $(I_j)$ 142A.

The SPADE generator 350G is in communication with the SPADE generator 360, as shown. The voxel renderer 320 (shown on the first sheet of FIG. 1) renders a set of rendered images $\{\hat{I}_k\}$ 325 which is used by the SPADE generator 360. This generator 350G and discriminator 350D in some implementations are trained by paired data comprising the plurality of GPS-registered camera images 146 and the set of segmentation images 180A. The generated set of pseudo ground truth images 370 is transmitted to the neural rendering discriminator 330D (shown on the first sheet of FIG. 1).

The following discussion includes a review of the process steps undertaken by the environment synthesis framework 1000 in somewhat greater detail, and in terms of the data sets and governing equations.

The infinite-pixel image synthesis module 100 in some implementations includes a map synthesis generative adversarial network (GAN) 110 that generates the synthesized 2D satellite map 120 in accordance with the set of synthesized 2D map images 160. The map synthesis GAN 110 in some implementations is a tool called InfinityGAN, which synthesizes arbitrarily large maps with a neural implicit representation. The image synthesis module 100 in some implementations generates categorical labels instead of realistic RGB satellite images. Some GANs encounter problems in propagating gradients while modeling discrete data. Accordingly, the image synthesis module 100 in some implementations assigns colors to each of the classes and trains the InfinityGAN on the categorical satellite map rendered with assigned colors. Later, the colors are converted back to a discrete category map with the nearest color.

To convert the predicted satellite images to an octree-based voxel representation 220 for the next stage (e.g., voxel completion module 200), the image synthesis module 100 in some implementations jointly models the height map information. To further regularize the structural plausibility, image synthesis module 100 in some implementations models the surface normal vector, which is the aggregate average surface normal over the unit region covered by a pixel in the satellite view.

The infinite-pixel image synthesis module 100 in some implementations includes a neural implicit generator 130G in operative communication with a patch contrastive discriminator 130D. The generator 130G and discriminator 130D in some implementations are trained by the set of synthesized 2D map images 160.

Compared to one of the original InfinityGAN settings, the synthesized 2D satellite map 120 has a larger field of view. Accordingly, InfinityGAN requires additional focus on the structural plausibility in the local region. Directly applying GAN-type adversarial learning on a large and dense matrix, in some cases, causes the discriminator to focus on global consistency and overall visual quality, instead of the local region details. Accordingly, the image synthesis module 100 in some implementations applies a contrastive patch discriminator 130D to increase the priority of the finer-grained, local region details.

The image synthesis module 100 in some implementations synthesizes tuples of arbitrary scale in this stage, as represented by the expression:

$$\hat{I}^{CDN} = G_\infty(z)$$

where all the inputs and outputs of $G_\infty(\cdot)$ can be of arbitrary spatial dimensions.

Figure 5:
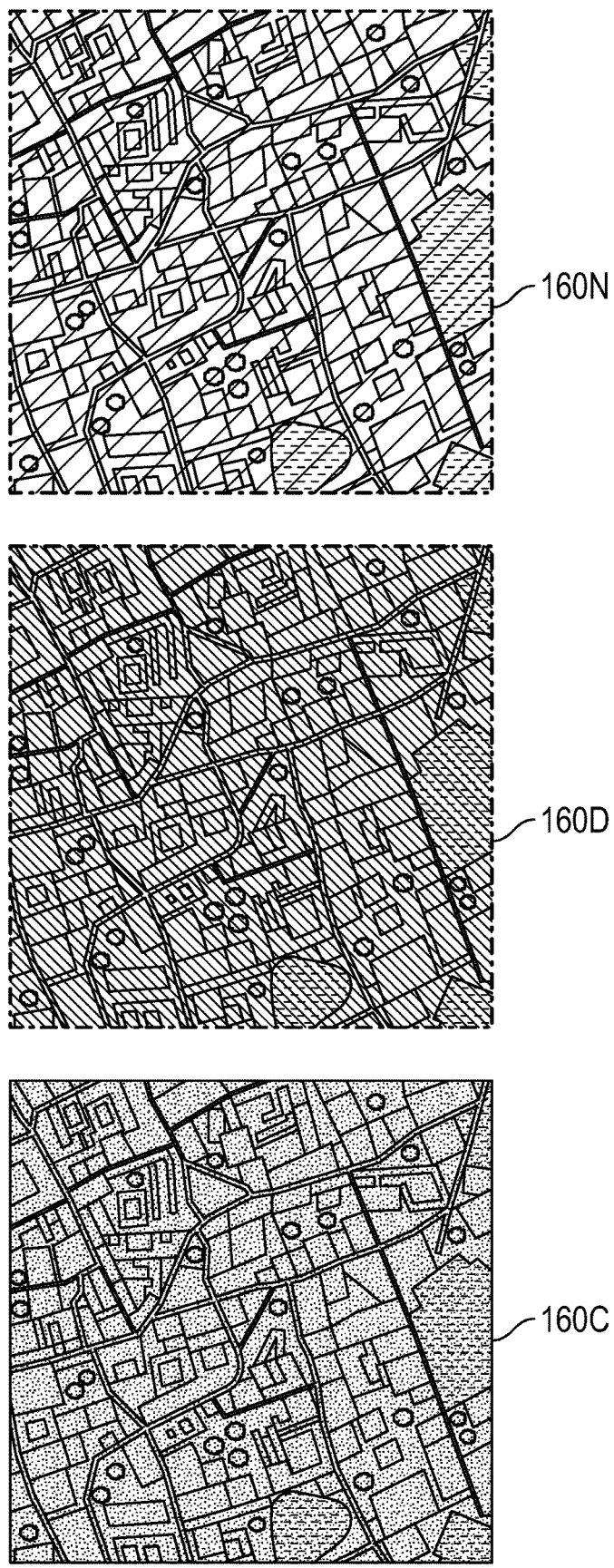
FIG. 5 is an illustration of an example set of synthesized 2D map images showing various layers.

An example set of synthesized 2D map images 160 is illustrated in FIG. 5. The map synthesis GAN 110 (InfinityGAN) along with the patch contrastive discriminator 130D is trained in multiple data modalities (e.g., category, depth, and normal). FIG. 5 includes an example 2D map image 160C associated with the category modality, an example 2D map image 160D associated with the depth modality, and an example 2D map image 160N associated with the normal modality.

The octree-based voxel completion module 200 in some implementations includes an octree-based 3D voxel representation 220 that is based on the synthesized 2D satellite maps ($\hat{I}^{CDN}$) 120, and an octree completion module 230 that converts the octree-based voxel representation 220 into a watertight 3D voxel environment 240 in accordance with the set of octrees 150. In this aspect, the voxel completion module 200 lifts the synthesized 2D map 120 into a set of 3D octrees 150. The watertight 3D voxel environment 240 in some implementations includes three-dimensional details because the neural rendering framework 300 includes a ray sampling tool 151 which involves ray-casting and requires reasonable ray-box intersection in the 3D space.

Voxel completion often requires immense amounts of memory, at least in part due to allocating unnecessary memory to the unused empty spaces. The voxel completion module 200 in some implementations utilizes the octree-based voxel representation 220 to minimize the impact of this memory issue. The voxel completion module 200 in some implementations utilizes a 3D completion framework 210 (e.g., using a model known as O-CNN) for efficient neural operations directly on the octrees. To better retain the surface information, the voxel completion module 200 in some implementations builds skip connections using a tool known as OUNet, trained with voxels having a spatial size of $64^3$. The 3D completion framework model O-CNN 210 is trained with the paired data $\{O_i, O_i^{SUR}\}$. At inference time, the voxel completion module 200 in some implementations partitions the synthesized 2D satellite maps ($\hat{I}^{CDN}$) 120 generated in the previous stage into patches of $64^2$ pixels, converts them into surface voxels in the octree-based voxel representation $\{\hat{O}_i^{SUR}\}$ 220, and obtains 3D-completed voxels according to the equation, $\hat{O}_i = G_{vox}(\hat{O}_i^{SUR})$ for each patch. As a spatially contiguous city surface is already illustrated by the satellite view, the separately processed octree blocks remain contiguous after the 3D completion and the subsequent spatial concatenation.

Figure 6:
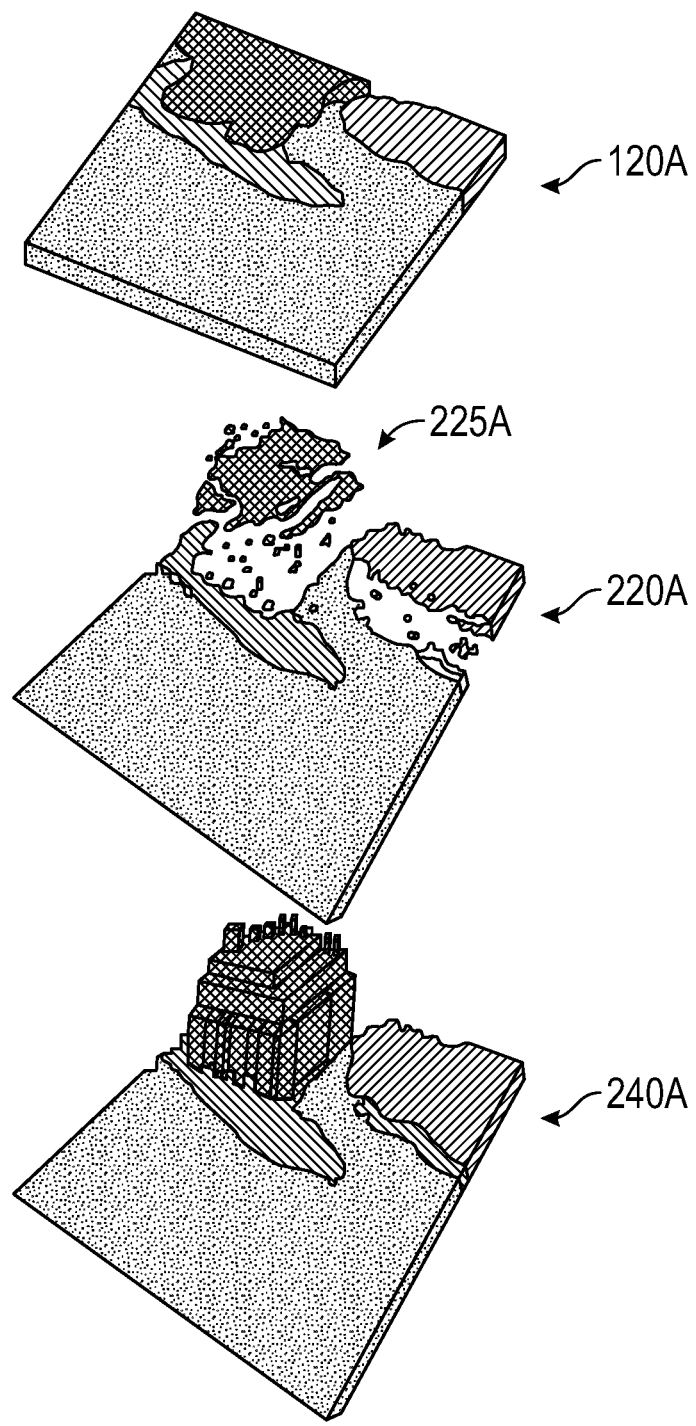
FIG. 6 is an illustration of an example synthesized 2D map, a corresponding octree-based voxel representation, and a corresponding watertight 3D voxel environment.

The outputs are visually plausible using the raw input from the process of generating the synthesized 2D satellite maps ($\hat{I}^{CDN}$) 120. In some cases, artifacts in the depth channel produce isolated pixels. These artifacts generate floating voxels 225 (e.g., voxels with no connection to the ground surface) as illustrated in FIG. 1 and FIG. 6, after converting the satellite maps 220 into surface voxels. The presence of floating voxels 225 leads to undesirable structures after applying the 3D completion framework model O-CNN 210. The voxel completion module 200 in some implementations employs bilateral filters to suppress these noises. The filter is applied multiple times with different space and color thresholds. The filter first applies larger kernels with small color thresholds to generate sharper edges for the structures (e.g., buildings in the city) and then applies smaller kernels with larger color thresholds to help remove the isolated pixels, which suppresses the noise and helps to minimize the presence of floating voxels 225.

An example synthesized 2D map 120A, a corresponding octree-based voxel representation 220A, and a corresponding watertight 3D voxel environment 240A are illustrated in FIG. 6. As shown, the example voxel representation 220A includes floating voxels 225A.

The voxel-based neural rendering framework 300 in some implementations includes a neural rendering generator 330G in operative communication with a neural rendering discriminator 330D. The neural generator 330G and neural discriminator 330D in some implementations are trained by the set of pseudo ground truth images 370.

The voxel-based neural rendering framework 300 in some implementations includes a ray sampling tool 151 in operative communication between the neural rendering generator 330G and the 3D voxel environment 240, such that the generator 330G during training retrieves one or more features of the voxel environment 240. As shown in FIG. 1, the neural rendering generator 330G in some implementations casts rays toward the 3D voxel environment 240 to identify and retrieve features.

The voxel-based neural rendering framework 300 in some implementations includes a neural framework 310 that generates the virtual environment 400 in accordance with the set of pseudo ground truth images 370.

The neural rendering framework 300 in some implementations renders the texturized images using a neural framework 310 (e.g., using a framework known as GAN-craft, which is particularly useful in synthesizing large-scale outdoor scenes). In accordance with the GAN-craft paradigm, the environment synthesis framework 1000 in some implementations includes a pseudo ground truth synthesis module 175 for generating a set of pseudo ground truth images 370 in accordance with an image ground truth pre-training GAN 372 (e.g., the SPADE model) by using the paired data $\{I_j^{seg}, I_j\}$ which includes a set of segmentation images $\{I_j^{seg}\}$ 180 and the corresponding set of street view images ($I_j$) 142. The trained SPADE model 372 in some implementations generates a set of pseudo ground truth images $\{I_k^{pseudo}\}$ given the segmentation maps sampled by the street-view renderer 170 using random camera poses ($p_k$). The watertight octree patches $\{\hat{O}_i\}$ are concatenated and converted into the GAN-craft-parameterized voxel representation ($\hat{V}$) where each of the voxels is parameterized by the parameters attached to its eight corners. Then, for each of the valid camera poses (valid $\{p_k\}$), the neural rendering generator 330G casts view rays (e.g., into the 3D voxel environment 240, as shown in FIG. 1) and extracts the per-pixel trilinear-interpolated features based on the ray-box intersection coordinates in the 3D voxel environment 240 space. In some implementations, the neural rendering model ($G_{neural}$) (which includes the generator 330G and discriminator 330D) is trained with randomly paired real street-view images ($I_j$) and pseudo ground truth images ($I_k^{pseudo}$) produced with the random camera poses $\{p_k\}$. The neural rendering model ($G_{neural}$) then renders a set of rendered images $\{\hat{I}_k\}$ 325 based on the features retrieved with $\{p_k\}$. In this aspect, the pseudo ground truth synthesis module 175 in some implementations includes a voxel renderer 320 for generating a set of rendered images 325 and a SPADE generator 360 in operative communication with the image ground truth pre-training GAN 372 and the set of rendered images 325.

The process of sampling the valid camera poses (valid $\{p_k\}$) is associated with several issues. To match the training distribution of the SPADE model 372, which generates the set of pseudo ground truth images $\{I_k^{pseudo}\}$ 370 associated with each camera view, the neural rendering framework 300 in some implementations samples the camera near the ground (instead of sampling the camera at a fly-through height, which is typically used in GAN-craft, the neural framework 310). This deviation is associated with another issue. A cityscape is typically occupied by lots of buildings and trees. And it is important to detect and minimized unwanted collisions between the camera and objects. In some implementations, the neural rendering framework 300 selects several walkable classes (e.g., road, terrain, bridge, greenspace) and labels the voxels associated with each walkable class. Because the SPADE model 372 often has poor performance with low-entropy inputs (e.g., directly facing a wall or structure having a uniform class) the neural rendering framework 300 in some implementations applies three steps of erosion and connected component labeling to remove the small alleys and similar spaces between buildings. The framework 300 then samples the camera locations according to the labeled zones, along with randomly sampled camera orientations. The training process sometimes becomes less stable and produces spiking gradients. Accordingly, the framework 300 in some implementations includes applying an R1 regularization to stabilize the training process.

In summary, the three-stage environment synthesis framework 1000 process can be expressed in equation form, as follows.

For the infinite-pixel synthesis module 100:

$$\hat{I}^{CDN} = G_\infty(z).$$

For the 3D octree-based voxel completion 200:

$$\{\hat{O}_i^{sur}\} = \text{convert}(\hat{I}^{CDN}), \{\hat{O}_i\} = G_{vox}(\hat{O}_i^{sur}).$$

For the voxel-based neural rending 300:

$$V = \text{aggregate}(\{\hat{O}_i\}), \{\hat{I}_k\} = G_{neural}(V, \{p_k\}).$$

Figure 3A:
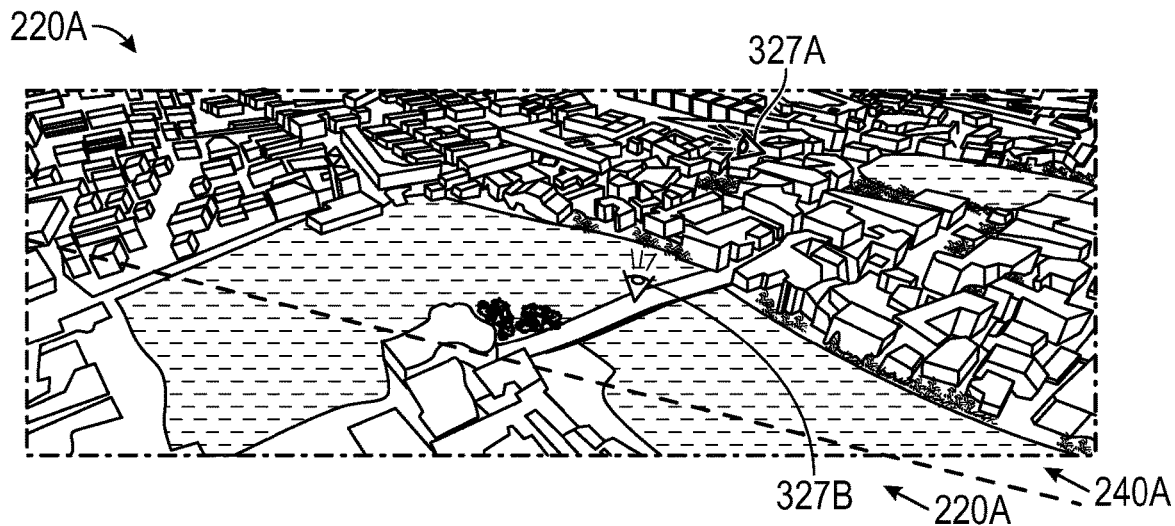
FIG. 3A is a perspective illustration of an example octree-based voxel representation and a watertight 3D voxel environment.
Figure 3B:
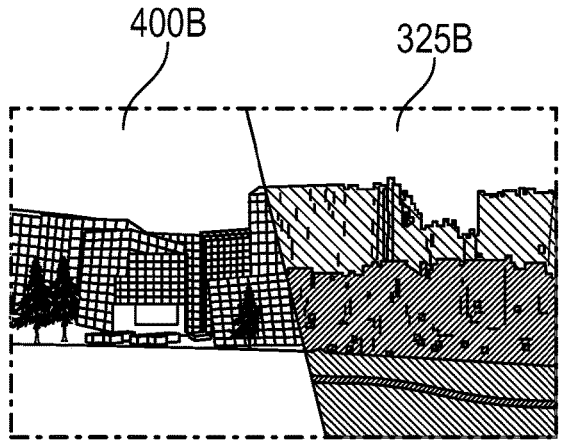
FIG. 3B is a perspective illustration of an example synthesized image and a corresponding final texturized 3D environment.
Figure 3C:
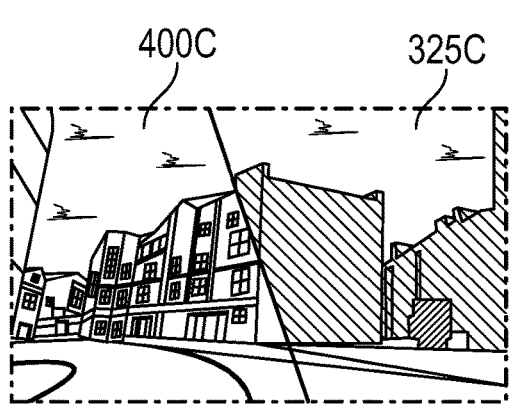
FIG. 3C is a perspective illustration of another example synthesized image and corresponding a final texturized 3D environment.

The three-stage synthesis framework 1000 is illustrated, conceptually, in a series of drawings, starting with FIG. 2 and including FIGS. 3A, 3B, and 3C.

FIG. 2 is a perspective illustration of an example set of synthesized 2D satellite maps ($\hat{I}^{CDN}$) 120A, showing the category, depth, and normal layers.

For the next stage, FIG. 3A is a perspective illustration of an example octree-based voxel representation 220A (in the lower left portion of the illustration) and a corresponding watertight 3D voxel environment 240A (in the upper right portion). FIG. 3A illustrates the 3D completion process taking place between the voxel representation 220A and the 3D voxel environment 240A.

For the final stage, FIG. 3B is a perspective illustration of an example synthesized image 325B (e.g., from the set of synthesized images $\{\hat{I}_k\}$ generated during neural rendering 300) and a view of the corresponding final texturized 3D environment 400B. The image 325B is associated with the first camera location 327A in FIG. 3A.

FIG. 3C is another perspective illustration of an example synthesized image 325C and its corresponding final texturized 3D environment 400C, based on the second camera location 327B in FIG. 3A.

An example of the virtual environment images 400 generated by the environment synthesis framework 1000 is shown in FIGS. 7A through 7D.

Figure 7:
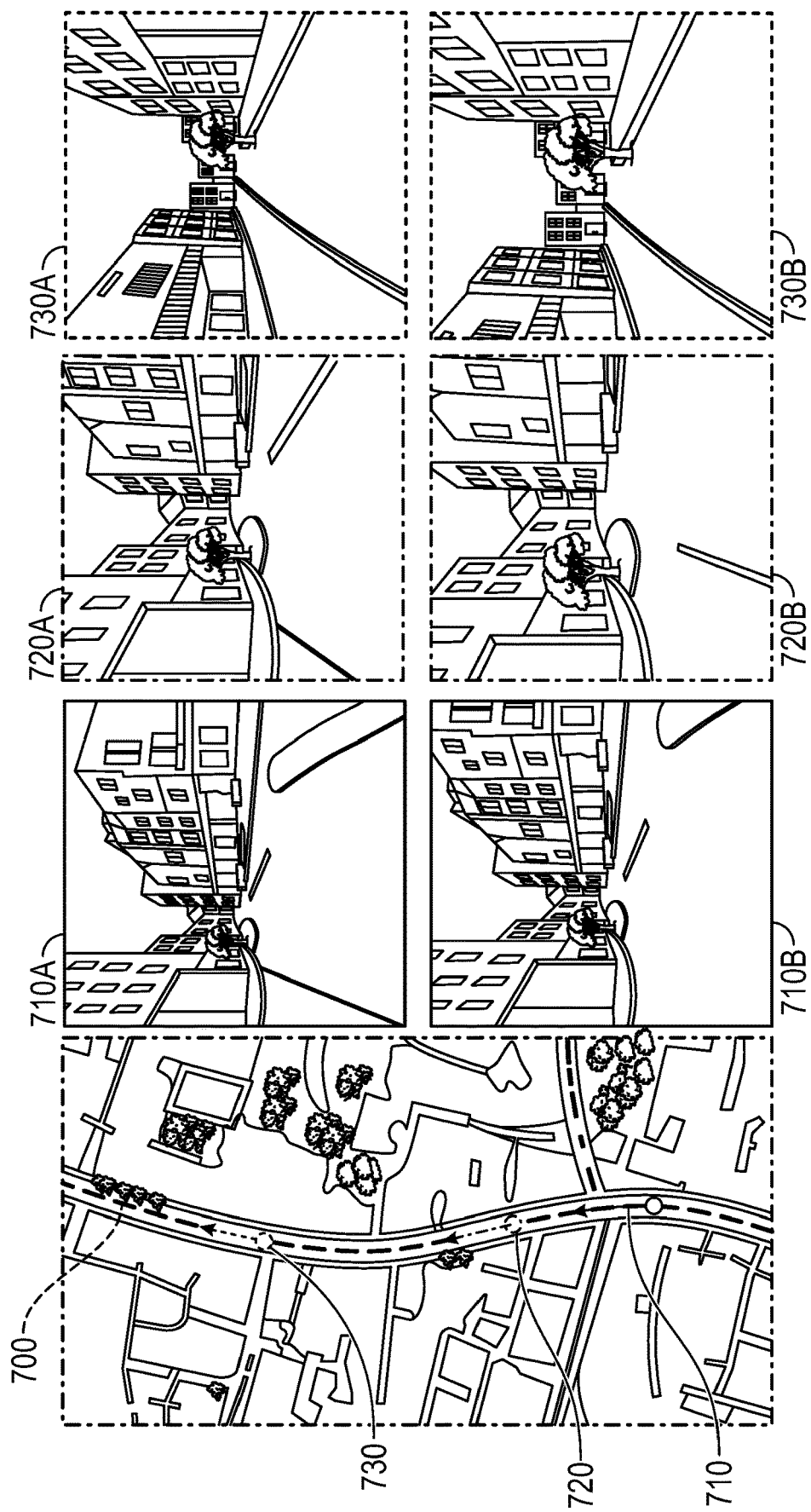
FIG. 7A is an illustration of a set of example virtual camera locations along a virtual camera trajectory.
FIG. 7B is a perspective illustration of two example views of final texturized 3D environment associated with the first virtual camera location shown in FIG. 7A.
FIG. 7C is a perspective illustration of two example views of final texturized 3D environment associated with the second virtual camera location shown in FIG. 7A.
FIG. 7D is a perspective illustration of two example views of final texturized 3D environment associated with the third virtual camera location shown in FIG. 7A.

FIG. 7A is an illustration of a set of example virtual camera locations 710, 720, 730 along a virtual camera trajectory 700. The example views are generated at each of three virtual camera locations 710, 720, 730 with relatively small camera movements indicated by the arrow direction.

FIG. 7B is a perspective illustration of two example views of final texturized 3D environment 710A, 710B associated with the first virtual camera location 710 shown in FIG. 7A. As shown the subsequent view 710B represents a virtual camera movement further into the street scene, as compared to the first view 710A. Similarly, FIG. 7C is a perspective illustration of two example views of final texturized 3D environment 720A, 720B associated with the second virtual camera location 720. FIG. 7D is a perspective illustration of two example views of final texturized 3D environment 730A, 730B associated with the third virtual camera location 730.

These results show a strong cross-view consistency of the 3D structures and a coherent global style, confirming that the underlying variables and rendering mechanisms are 3D-grounded.

Interactive Sampling GUI: The environment synthesis framework 1000 in some implementations includes an interactive sampling interface (GUI) for selecting and editing a region of interest. For example, the generator may synthesize a bridge for longer than the momentary receptive field of the generator, resulting in the bridge apparently terminating in the middle of the span because the local latent vectors corresponding to the bridge features move beyond the momentary receptive field.

Figure 4B:
FIG. 4B is an illustration of the example region of interest after re-sampling.
Figure 4A:
FIG. 4A is an illustration of an example region of interest.

FIG. 4A is an illustration of an example region of interest 455A in which a road appears to extend into a lake. The interface in some implementations resamples the local latent variables and randomized noises; in effect, running the map synthesis GAN 110 (InfinityGAN) through an additional iteration for the region of interest 455A shown by a bounding box. Note that the contents outside the bounding box can be altered during re-sampling because the latent variables near the edges of the bounding box will affect the nearby content outside the box, based on the receptive field of the generator. FIG. 4B is an illustration of the example region of interest 455B after re-sampling, in which the road no longer appears to extend into the lake.

The interface in some implementations includes a sophisticated queuing system. InfinityGAN is capable of spatially independent generation, in which the generator can independently generate one or more image patches without accessing the whole set of local latent variables. Accordingly, the interface can queue each patch synthesis task as a job in a first-in, first-out queue, and also run interference in a batch manner by tensor-stacking multiple jobs in the queue. In another aspect, for each selected region of interest, the interface in some implementations implements a feature calibration mechanism to collect only the subset of variables that has a contribution to the pixels within the selected region. Then, this subset of variables is re-sampled and pushed to the queue. Accordingly, the interface performs the necessary computations with an improved GPU utilization rate, increasing the inference speed by a large margin.

Techniques described herein may be used with one or more of the computing systems described herein or with one or more other systems. For example, the various procedures described herein may be implemented with hardware or software, or a combination of both. For example, at least one of the processor(s), memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computing systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computing system. As an example, implementations can include distributed processing, component/object distributed processing, and parallel processing. Moreover, virtual computing system processing can be constructed to implement one or more of the techniques or functionalities, as described herein.

Figure 8:
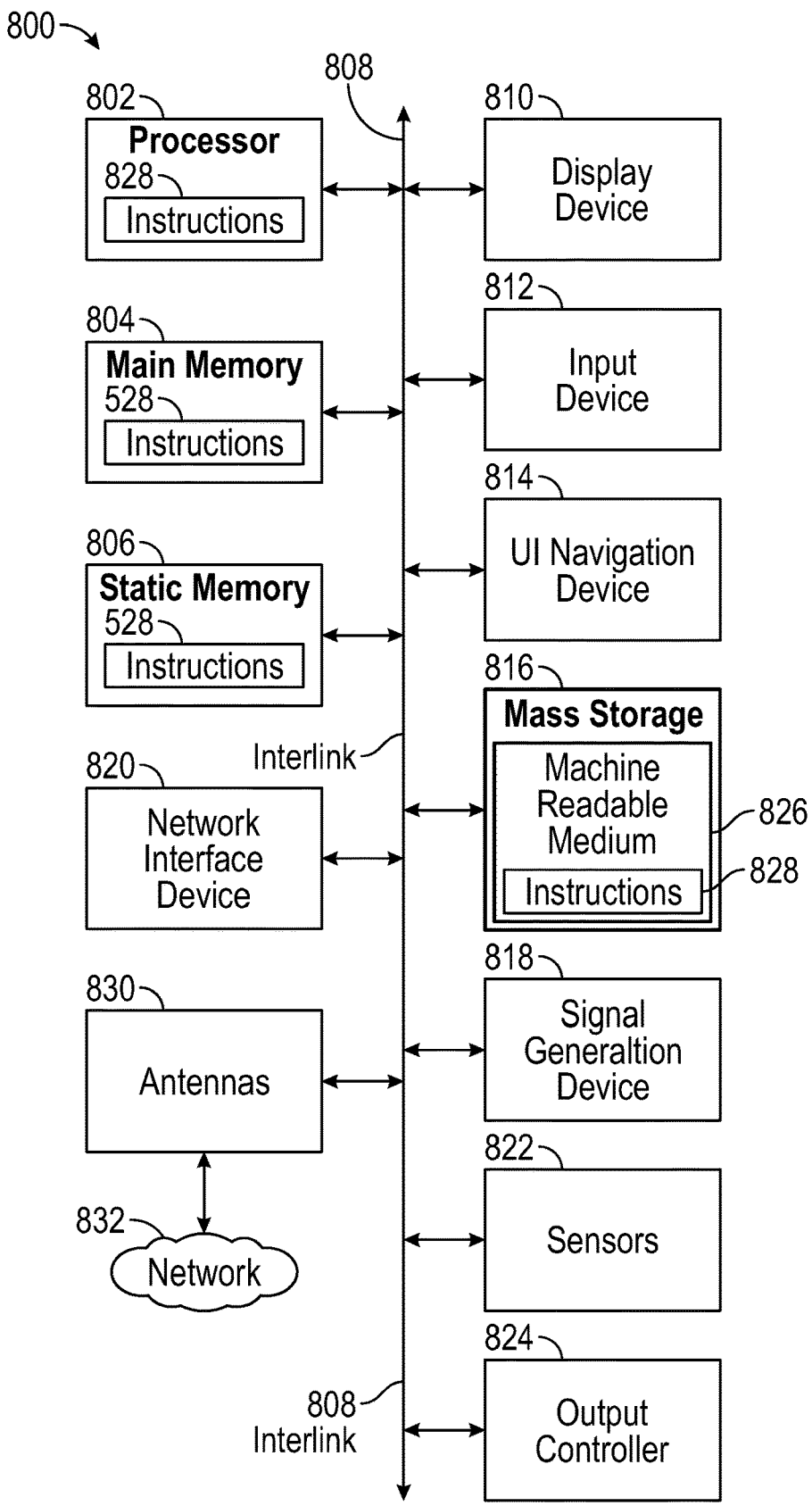
FIG. 8 is a block diagram of a sample configuration of a machine adapted to implement the method of generating 3D representations of objects in accordance with the systems and methods described herein.

FIG. 8 illustrates an example configuration of a machine 800 including components that may be incorporated into the processor 802 to manage generation of virtual environments.

In particular, FIG. 8 illustrates a block diagram of an example of a machine 800 upon which one or more configurations may be implemented. In alternative configurations, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. In sample configurations, the machine 800 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 800 may serve as a workstation, a front-end server, or a back-end server of a communication system. Machine 800 may implement the methods described herein by running the software used to implement the features described herein. Further, while only a single machine 800 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computing systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computing system or processor) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810 (shown as a video display), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a mass storage device (e.g., drive unit) 816, a signal generation device 818 (e.g., a speaker), a network interface device 820, and one or more sensors 822. Example sensors 822 include one or more of a global positioning system (GPS) sensor, compass, accelerometer, temperature, light, camera, video camera, sensors of physical states or positions, pressure sensors, fingerprint sensors, retina scanners, or other sensors. The machine 800 may include an output controller 824, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 816 may include a machine readable medium 826 on which is stored one or more sets of data structures or instructions 528 (e.g., software) embodying or utilized by any one or more of the techniques or functions described herein. The instructions 528 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage device 816 may constitute machine readable media.

While the machine readable medium 826 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 828 may further be transmitted or received over communications network 832 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.18.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas 830 to connect to the communications network 832. In an example, the network interface device 820 may include a plurality of antennas 830 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

The features and flowcharts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computing system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A framework for generating virtual environments, the framework comprising:
   a city dataset comprising a set of synthesized two-dimensional (2D) map images associated with a geographic area, wherein the city dataset comprises one or more of a plurality of street view images, a CAD model, and a plurality of GPS-registered camera images;
   an infinite-pixel image synthesis module operative to utilize a map synthesis generative adversarial network (GAN) and the set of synthesized 2D map images, wherein the infinite-pixel image synthesis module is operative to generate a synthesized two-dimensional (2D) satellite map associated with the geographic area;
   an octree-based voxel completion module operative to generate a set of octrees based on the set of synthesized 2D map images, to generate an octree-based voxel representation based on the synthesized 2D satellite map, and to convert the octree-based voxel representation into a three-dimensional (3D) voxel environment based on the set of octrees; and
   a voxel-based neural rendering framework operative to generate a 3D virtual environment based on the 3D voxel environment, such that the 3D virtual environment resembles the geographic area.

2. The framework of claim 1, further comprising:
   a dataset pre-processing module operative to generate the set of synthesized 2D map images and to generate the set of octrees based on the city dataset; and
   an octree completion module that is operative to convert the octree-based voxel representation into the 3D voxel environment in accordance with the set of octrees.

3. The framework of claim 1, wherein the infinite-pixel image synthesis module further comprises:
   a neural implicit generator in operative communication with a patch contrastive discriminator, wherein the infinite-pixel image synthesis module is operative to train the neural implicit generator and the patch contrastive discriminator using the set of synthesized 2D map images.

4. The framework of claim 1, further comprising:
   a pseudo ground truth synthesis module that is operative to generate a set of pseudo ground truth images in accordance with an image ground truth pre-training generative adversarial network (GAN),
   wherein the voxel-based neural rendering framework further comprises a neural rendering framework that is operative to generate the 3D virtual environment in accordance with the set of pseudo ground truth images.

5. The framework of claim 4, wherein the pseudo ground truth synthesis module further comprises:
   a voxel renderer operative to generate a set of rendered images; and
   a SPADE generator in operative communication with the image ground truth pre-training GAN and the voxel renderer, such that the set of pseudo ground truth images is based on the set of rendered images.

6. The framework of claim 4, wherein the voxel-based neural rendering framework further comprises:
   a neural rendering generator in operative communication with a neural rendering discriminator, wherein the neural rendering generator and the neural rendering discriminator are trained using the set of pseudo ground truth images.

7. The framework of claim 6, wherein the 3D voxel environment comprises a plurality of features, and wherein the voxel-based neural rendering framework further comprises:
   a ray sampling tool in operative communication between the neural rendering generator and the 3D voxel environment, such that the neural rendering generator during training retrieves one or more of the plurality features associated with the 3D voxel environment.

8. The framework of claim 1, further comprising:
   a voxel renderer operative to generate a set of rendered images;
   a SPADE generator in operative communication with a SPADE discriminator, wherein the SPADE generator and the SPADE discriminator are trained using the set of rendered images;
   a street view renderer operative to generate a set of segmentation images:
   an image ground truth pre-training GAN in communication with the SPADE generator, wherein the image ground truth pre-training GAN is operative to use paired data to further train the SPADE generator and the SPADE discriminator, wherein the paired data comprises the plurality of GPS-registered camera images and the set of segmentation images.

9. A method of generating virtual environments, comprising:
accessing a city dataset comprising a set of synthesized two-dimensional (2D) map images associated with a geographic area, wherein the city dataset comprises one or more of a plurality of street view images, a CAD model, and a plurality of GPS-registered camera images;
generating a synthesized two-dimensional (2D) satellite map associated with the geographic area utilizing a map synthesis generative adversarial network (GAN) and the set of synthesized 2D map images;
generating a set of octrees based on the set of synthesized 2D map images;
generating an octree-based voxel representation based on the synthesized 2D satellite map; and
converting the octree-based voxel representation into a three-dimensional (3D) voxel environment based on the set of octrees; and
generating a 3D virtual environment based on the 3D voxel environment, such that the 3D virtual environment resembles the geographic area.

10. The method of claim 9, further comprising:
training, using the set of synthesized 2D map images, a neural implicit generator in operative communication with a patch contrastive discriminator.

11. The method of claim 9, further comprising:
generating a set of pseudo ground truth images in accordance with an image ground truth pre-training generative adversarial network (GAN); and
generating the 3D virtual environment, using a neural rendering framework, in accordance with the set of pseudo ground truth images.

12. The method of claim 11, further comprising:
generating a set of rendered images using a voxel renderer; and
training, using the set of rendered images, a SPADE generator in operative communication with the image ground truth pre-training GAN, such that the set of pseudo ground truth images is based on the set of rendered images.

13. The method of claim 11, further comprising:
training, using the set of pseudo ground truth images, a neural rendering generator in operative communication with a neural rendering discriminator.

14. The method of claim 13, wherein the 3D voxel environment comprises a plurality of features, and wherein the method further comprises:
retrieving one or more of the plurality of features associated with the 3D voxel environment using a ray sampling tool, wherein the ray sampling tool is in operative communication between the neural rendering generator and the 3D voxel environment.

15. The method of claim 9, further comprising:
generating a set of rendered images using a voxel renderer; and
training a SPADE generator in operative communication with a SPADE discriminator using the set of rendered images, wherein the SPADE generator is in operative communication with an image ground truth pre-training GAN;
generating a set of segmentation images using a street view renderer;
training the SPADE generator and the SPADE discriminator using paired data, wherein the paired data comprises the plurality of GPS-registered camera images and the set of segmentation images.

16. A non-transitory computer-readable medium including instructions for generating virtual environments, wherein the instructions, when executed by a processor, configure the processor to perform functions, including functions to:
access a city dataset comprising a set of synthesized two-dimensional (2D) map images associated with a geographic area, wherein the city dataset comprises one or more of a plurality of street view images, a CAD model, and a plurality of GPS-registered camera images;
generate a synthesized two-dimensional (2D) satellite map associated with the geographic area utilizing a map synthesis generative adversarial network (GAN) and the set of synthesized 2D map images;
generate a set of octrees based on the set of synthesized 2D map images;
generating an octree-based voxel representation based on the synthesized 2D satellite map; and
convert the octree-based voxel representation into a 3D voxel environment based on the set of octrees; and
generating a 3D virtual environment based on the 3D voxel environment, such that the 3D virtual environment resembles the geographic area.

17. The medium of claim 16, wherein the instructions further configure the processor to perform further functions, including functions to:
generate a set of pseudo ground truth images in accordance with an image ground truth pre-training generative adversarial network (GAN); and
generate the 3D virtual environment, using a neural rendering framework, in accordance with the set of pseudo ground truth images.

18. The medium of claim 17, wherein the instructions further configure the processor to perform further functions, including functions to:
train, using the set of pseudo ground truth images, a neural rendering generator in operative communication with a neural rendering discriminator.

* * * * *